Sept. 27, 1955    P. J. SCAFIDI    2,718,745
ROTARY PICKUP DEVICE
Filed May 21, 1954    2 Sheets-Sheet 1
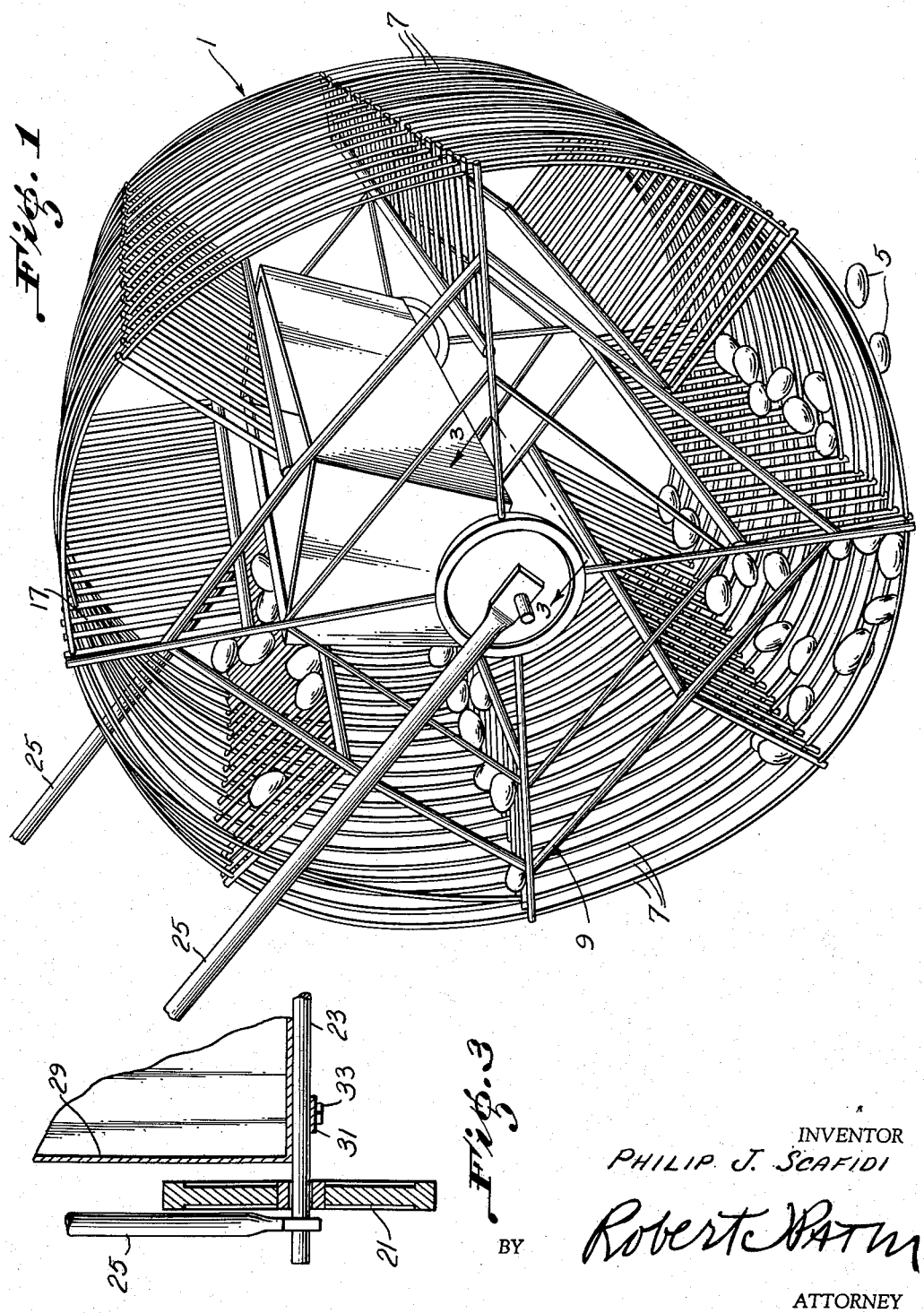
INVENTOR
PHILIP J. SCAFIDI
BY Robert Batm
ATTORNEY Sept. 27, 1955 P. J. SCAFIDI 2,718,745
ROTARY PICKUP DEVICE
Filed May 21, 1954 2 Sheets-Sheet 2
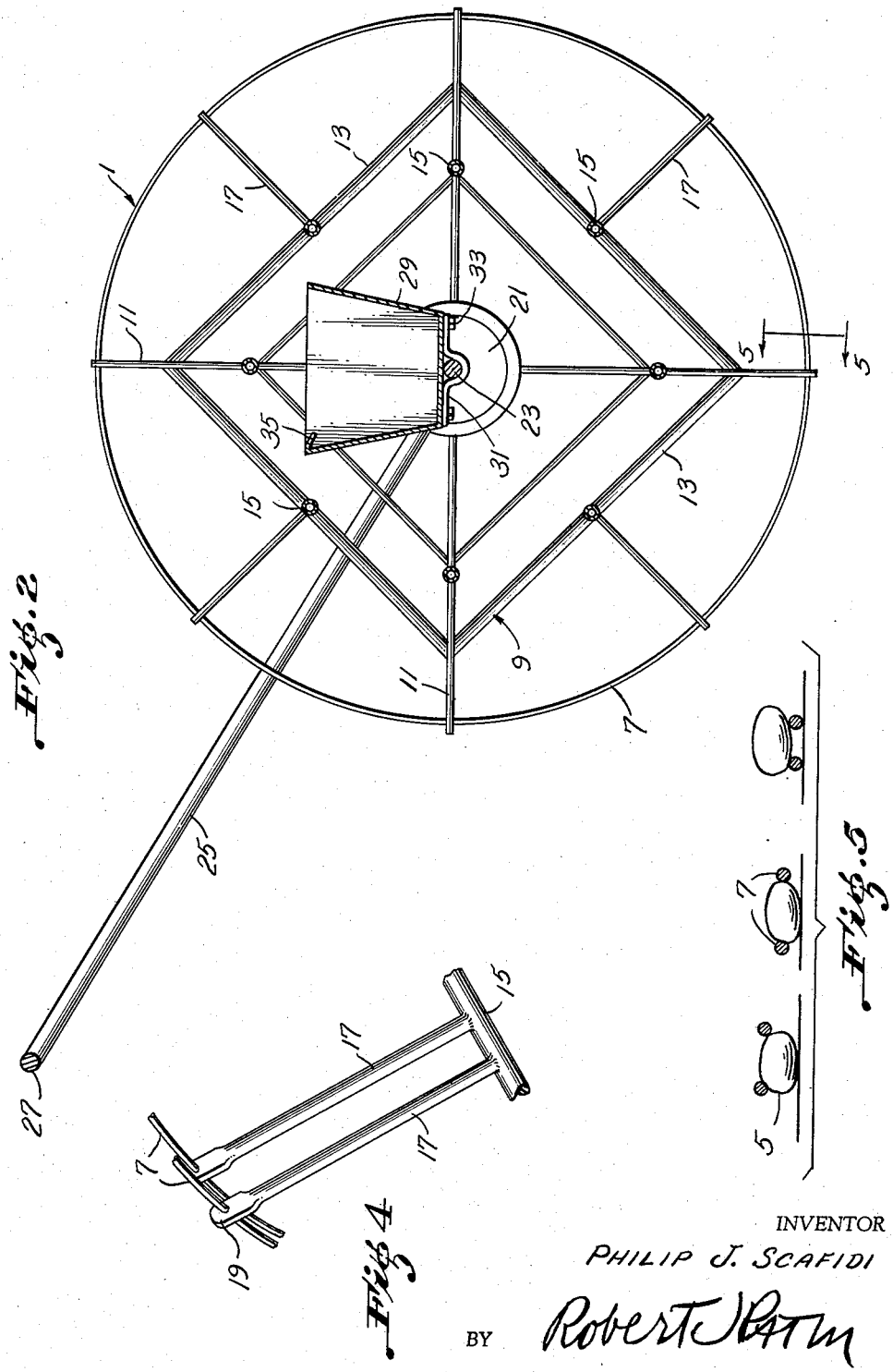
INVENTOR
PHILIP J. SCAFIDI
BY Robert J. Patin
ATTORNEY United States Patent Office 2,718,745
Patented Sept. 27, 1955

2,718,745
ROTARY PICKUP DEVICE
Philip J. Scafidi, Bay St. Louis, Miss.
Application May 21, 1954, Serial No. 431,355
4 Claims. (Cl. 56—328)

My invention relates to devices adapted to pick up small, hard objects lying on the ground, and more particularly to devices such as nut harvesters adapted to traverse the ground and to pick up nuts or the like lying in their path.

Various outdoor industries such as the agriculture industry, and more particularly the nut industry, have long been faced with the problem of picking up great quantities of small, hard objects from the ground. Taking the nut industry as an example, it is well known that nuts such as pecans and walnuts may be harvested simply by gathering them up after they have fallen to the ground. Simple though this method of harvesting may at first appear, it is nevertheless time consuming and laborious, since the nuts are ordinarily quite small in size, with the result that many separate manual operations of gathering must be performed before a sizable volume of nuts is assembled. In an attempt to overcome this difficulty, it has been proposed to assemble the nuts by means of rakes, either manually operated or power driven; however, in doing so, a great deal of extraneous material such as leaves, vines and dirt was included in the mass of nuts.

Although a number of other attempts were made to overcome the foregoing difficulties and disadvantages of the prior art gathering devices, none, so far as I am aware, was entirely successful when carried into practice on a commercial scale.

Accordingly, it is an object of the present invention to provide gathering means adapted to pick up and collect a number of small, hard objects lying on the ground.

Another object of the invention is to provide a nut harvester adapted to traverse the ground and to pick up nuts or the like lying in its path.

The invention also contemplates the provision of means adapted to roll over the ground and to pick up small, hard objects lying on the ground in its path.

It is a further object of the invention to provide a nut harvester adapted to roll over the surface of the ground and resiliently engage nuts or the like lying on the surface of the ground in its path and to pick up and collect the nuts.

Other objects and advantages will become apparent from the following description taken in conjunction with the accompanying drawings in which:

Figure 1 is a perspective view of a nut harvester according to the present invention.

Figure 2 is a side elevational view on a reduced scale of the nut harvester of Figure 1 with parts broken away and shown in section.

Figure 3 is a fragmentary sectional view taken on a plane including the axis of rotation of the nut harvester, on the line 3—3 of Fig. 1.

Figure 4 is a fragmentary view showing the mounting of the loops.

Figure 5 is a schematic view showing three steps in the reception of a nut by the harvester, taken on the line 5—5 of Fig. 2.

Broadly stated, the present invention contemplates the provision of a device for picking up hard objects from the ground comprising a cylindrical rotor adapted to be rolled over the surface of the ground in contact therewith and having resilient means associated with the ground engaging surface thereof for picking up hard objects from the ground in the path of said rotor.

Referring now to the drawings, Figure 1 shows a perspective view of a pick-up device such as a nut harvester according to the invention, comprising a cylindrical rotor 1 adapted to roll over the surface of the ground and pick up nuts 5 or other small hard objects lying in its path. The cylindrical contour of the rotor 1 is defined by a plurality of resilient loops 7 which are generally circular and which lie in spaced apart side-by-side relation. The series of loops is formed by a plurality of turns of a continuous helix or coil; but the loops may also be formed by a plurality of separate rings of generally circular shape disposed substantially parallel to each other. In either event, the loops are made from spring steel wire, or other thin, resilient material.

The loops are held in their desired position relative to each other by a rigid framework 9 which in the embodiment shown in the drawings is made up of a plurality of radial bars 11 and diagonal struts 13 disposed at either end of the cylindrical rotor and lying substantially within the cylindrical contour thereof. The bars 11 and struts 13, and hence the resilient loops 7, are held in spaced apart relation axially of the rotor by a plurality of crossbars 15, which also serve as detent means temporarily to arrest the progress of nuts passing thereover. The crossbars 15 are rigidly secured in the framework 9, as by welding or the like, with the result that the entire framework 9 provides a strong, rigid support for the resiliently deformable loops 7.

The loops 7 are mounted on the framework 9 by means of a plurality of short radial members 17, fixedly mounted at their inner ends to the crossbars 15 as by welding or the like, as shown in Figure 4, and extending generally radially outwardly therefrom in spaced apart, side-by-side substantially parallel relationship. The number of short radial members 17 carried by each crossbar 15 will correspond to the number of loops 7; and the spacing between adjacent short radial members will be roughly the spacing desired between adjacent loops 7.

For the purpose of attaching the loops to the short radial members, the latter are provided with flattened and pierced outer ends 19, as shown in Figure 4, through which the material comprising the resilient loops is threaded. It will be appreciated that the final assembly of the cylindrical rotor is effected by simply threading a substantial length of straight spring steel wire or other straight length of resilient material through successive outer ends 19, in which case the innate resiliency of the material comprising the loops will force that material to assume the desired substantially circular shape shown in Figure 2. If the resilient loops are comprised of separate rings, then separate lengths of resilient material must be cut, threaded and joined as by butt welding.

The framework 9 is provided with a pair of axially spaced apart central bearing hubs 21 which are journaled for rotation on a cross shaft 23 which forms the axis of rotation of the cylindrical rotor. Fixed rigidly on cross shaft 23 is a pair of side bars 25 for use in pushing or pulling the gathering device over the surface of the ground. If desired, the side bars may be joined together at their rear ends by a handle 27, in which case the gatherer becomes an implement which may be pushed by a person on foot. Of course it will be understood that instead of propulsion by hand, the device may be moved by a tractor, a horse, or other motive power means. In any event, the rotor is thus journaled for rotation between the side bars.

Between the hubs 21 and within the contour of the cylindrical rotor, a container 29 is fixedly mounted on cross shaft 23. The placement of the container relative to the hubs and side bars is best seen in fragmentary cross section in Figure 3 and is also shown in perspective in Figure 1. Container 29 may be in the form of a hopper, open at the top, having the general shape of a trough and having inclined sides, and being fixedly mounted on cross shaft 23 by means of straps 31 and bolts 33. The container may also be provided with an inwardly and downwardly inclined lip 35 for the purpose of directing objects which fall into the container, as will be more fully explained hereinafter.

The operation of the device is as follows: Assuming for purposes of illustration that the gathering device is being pushed over the ground toward the right as seen in Figure 1, it will be observed that several nuts 5 lie in the path of the device. As the device rolls into contact with the nuts, each nut will tend to position itself in the space between two adjacent resilient loops 7, as shown in the lefthand schematic view of Figure 5. As the gathering device continues in motion in the same direction, the loops will tend to press down with increasing force upon the nuts lying on the ground. As a result, the two adjacent loops in contact with the nut will tend to spread apart and slide around the nut, as shown in the central schematic view of Figure 5. Ultimately, the nut will be forced entirely between the adjacent loops, and the resilient loops will then spring back to normal spacing, as shown in the righthand schematic view of Figure 5. Thereafter, the nut will be retained within the cylindrical contour of the rotor, since the weight of the nut is manifestly insufficient to spread the loops apart again sufficiently to allow the nut to escape.

As the gathering device continues its movement still farther, the cylindrical rotor will turn about cross shaft 23 in a clockwise manner, as seen in Figures 1 and 2. The nut, which would normally seek the lowest point within the contour of the rotor under the influence of gravity, will be carried up and clockwise around the cross shaft by the assemblies of crossbars 15 and short radial members 17, which assemblies in this sense serve as baffle means.

As the nuts are carried clockwise upward, they tend to fall into the trough formed in effect between adjacent short radial members 17. As the nuts are carried still farther upward, the angle of the short radial members increases beyond the angle of repose of the nut in the trough between adjacent members 17, with the result that the nut will slide generally radially inwardly down the trough between adjacent members 17 and will temporarily come to rest against the associated crossbar 15, which as stated hereinbefore serves in this sense as a detent means. Thus, the nut will be carried around clockwise some distance farther, in contact with crossbar 15; but ultimately, the angulation of the short radial members 17 will be so great that the nut will fall from crossbar or detent means into container 29. For this purpose, as explained hereinbefore, it may be convenient to have an inclined lip 35 at the rear upper edge of the container, so that the nuts falling into the container are distributed more evenly toward the front portion of the container.

The above operation makes it obvious that some provision must be made for maintaining the container upright for the proper reception of nuts. To this end, I have made the assembly of container, cross shaft and side bars integral, so that when side bars 25 are maintained at their predetermined operative position, container 29 will be at all times maintained upright. It is also apparent that the rotation of cylindrical rotor 1 must not interfere with the proper positioning of container 29; and to this end I construct the baffle means comprising crossbars 15 and short radial members 17 in such a way that they terminate inwardly short of the greatest radial extent of container 29, as clearly shown in Figure 2.

It will also be apparent that although I have described my invention primarily in connection with the harvesting of nuts, my invention is also applicable to picking up a great variety of small, hard objects from the ground, including golf balls and stones and other like objects.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A nut harvester adapted to be moved over the surface of the ground in contact therewith to pick up and store nuts in its path, comprising in combination a cross shaft, an upwardly open container rigidly mounted on top of said cross shaft, a pair of side bars rigidly mounted on the ends of said cross shaft, a pair of spaced hubs mounted for rotation on said cross shaft between said side bars, a plurality of radial bars mounted on and extending radially outward from each said hub, a plurality of cross bars mounted at each end on said radial bars parallel to said cross shaft, a plurality of short radial members mounted at their inner ends on said cross bars and extending radially away from said cross shaft, and a plurality of resilient loops all of the same diameter in spaced apart side-by-side relation carried by the outer ends of said short radial members and concentric with said cross shaft, said loops comprising a continuous helix.

2. The invention of claim 1, in which said short radial members are provided with flattened and pierced outer ends through which said resilient loops pass.

3. The invention of claim 2, in which said resilient loops comprise a continuous helix of spring wire threaded through said flattened and pierced outer ends of said short radial members.

4. The invention of claim 1, and a plurality of diagonal struts fixed at each end to said radial bars and lying in a plane perpendicular to said cross shaft, further cross bars mounted at each end on said diagonal struts parallel to said cross shaft, and further short radial members mounted at their inner ends on said further cross bars and extending radially away from said cross shaft, said loops being carried also by the outer ends of said further short radial members.

References Cited in the file of this patent

UNITED STATES PATENTS

| | | |
|---|---|---|
| 1,644,366 | Brown | Oct. 4, 1927 |
| 1,859,980 | Mueller | May 24, 1932 |
| 2,267,879 | Tillitt | Dec. 30, 1941 |
| 2,482,355 | McBride | Sept. 20, 1949 |
| 2,539,596 | Smith | Jan. 30, 1951 |
| 2,694,284 | Kortz | Nov. 16, 1954 |

FOREIGN PATENTS

| | | |
|---|---|---|
| 1,388 | Great Britain | 1902 |
| 3,628 | Great Britain | 1902 |